United States Patent [19]

Haswell

[11] 4,040,501
[45] Aug. 9, 1977

[54] LIFT TRUCK

[76] Inventor: John W. Haswell, 44429 Harmony Lane, Belleville, Mich. 48111

[21] Appl. No.: 680,193

[22] Filed: Apr. 26, 1976

[51] Int. Cl.² .......................................... B62D 25/10
[52] U.S. Cl. ................................ 180/89.18; 180/69 C
[58] Field of Search ............... 180/89 A, 69 R, 69 C, 180/77 TC, 89.18; 296/28 C

[56] References Cited

U.S. PATENT DOCUMENTS

| | | | |
|---|---|---|---|
| 2,699,223 | 1/1955 | Brumbaugh | 180/89 A |
| 2,857,977 | 10/1958 | Bock | 180/89 A |
| 2,931,452 | 4/1960 | Mackie | 180/69 C |
| 3,261,422 | 7/1966 | Jensen | 180/69 C |
| 3,924,706 | 12/1975 | Figura | 180/89 A |

FOREIGN PATENT DOCUMENTS 922,438  5/1965  United Kingdom .............. 180/89 A Primary Examiner—Philip Goodman
Assistant Examiner—Terrance L. Siemens
Attorney, Agent, or Firm—McNenny, Pearne, Gordon, Gail, Dickinson & Schiller

[57] ABSTRACT

A fork lift truck having an improved arrangement providing convenient access to the engine compartment alone or to both the engine and drive train compartments. A shroud covers the engine and the drive train and a portion of the shroud is pivotally connected to the truck chassis so that the engine and drive train may be exposed for maintenance by lifting the shroud portion. A hatch, which comprises a part of the pivotal shroud portion, is pivotally connected to the chassis so that the hatch may be raised to expose only the engine for maintenance.

2 Claims, 5 Drawing Figures

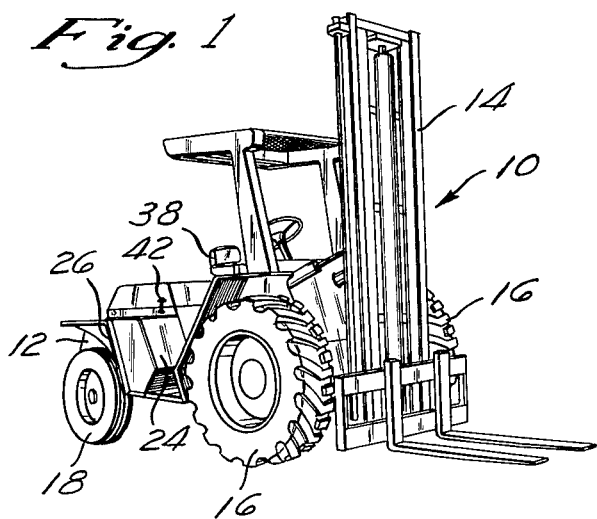
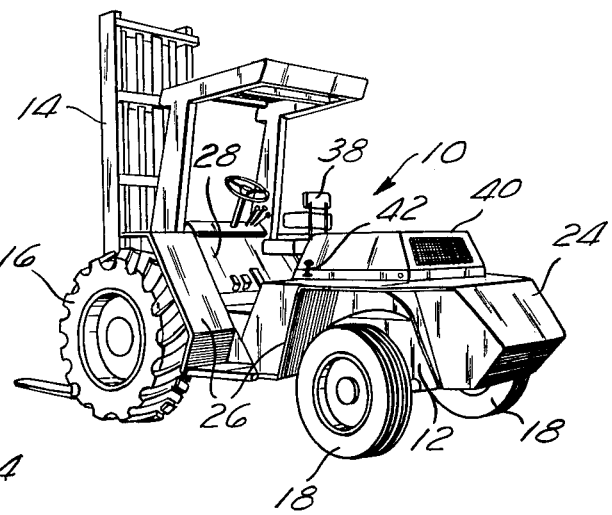
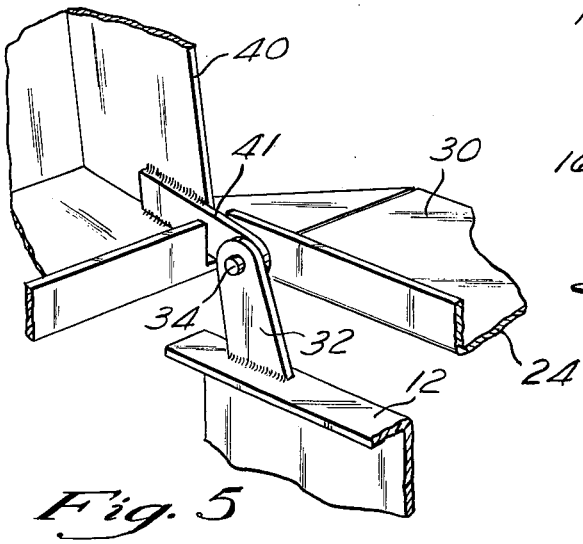
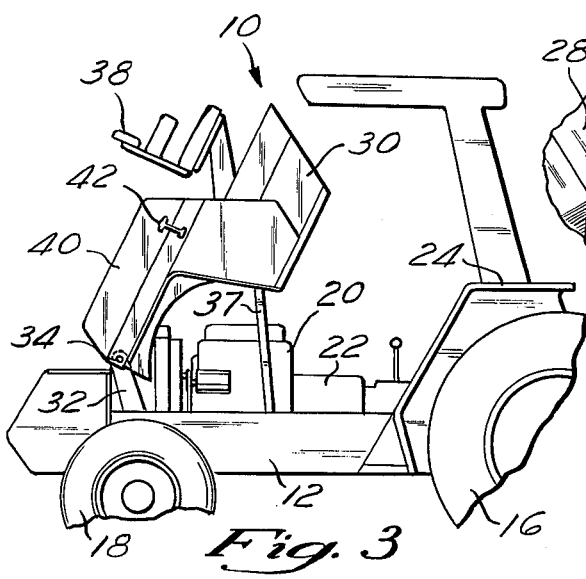
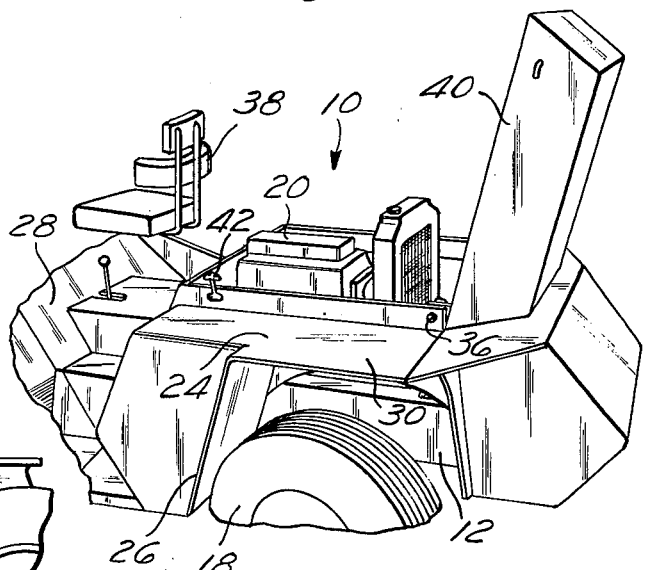

LIFT TRUCK

BACKGROUND OF THE INVENTION

This invention relates to fork lift trucks and, more particularly, to fork lift trucks having an improved arrangement for providing convenient access to the engine compartment alone or to both the engine and drive train compartments. It is customary for on-the-road vehicles to be provided with a forward tilting cab shroud which exposes the engine and drive train components for servicing and maintenance. Thus, both major and minor maintenance and servicing operations may only be accomplished by tilting the entire cab structure forward. While access to all of the engine and drive train components is a desideratum for major overhauls and repair and maintenance situations which require access to engine and drive train components, it is a nuisance to tilt the entire cab if only minor maintenance or servicing is required on the engine.

Typically, fork lift vehicles have shrouds covering the engine and drive train, and these shrouds are releasably fastened to the chassis. To perform maintenance or service on the engine and/or drive train, the shroud must be unfastened and physically removed from the chassis. Here again, such a procedure is a nuisance if only minor servicing of the engine is indicated.

SUMMARY OF THE INVENTION

This invention overcomes many of the problems and inconveniences found in the prior art by providing an arrangement wherein there exists convenient access to the engine compartment alone, or to both the engine and drive train compartments or a fork lift truck. According to the invention, a fork lift truck includes a chassis, a fork lift mounted at one end of the chassis in front of a pair of front wheels, an engine mounted on the chassis adjacent the rear end of the chassis, and a drive train from the engine to the front wheels. A shroud covers the engine and the drive train, and a portion of the shroud is pivotally connected to the chassis to permit that portion to be swung open to expose both the engine and the drive train. To this end, there are provided pivot pins fixed to the chassis which are received within pivot openings in the aforementioned portion of the shroud. Furthermore, the pivotal portion of the shroud includes a hatch covering the engine compartment and the hatch may be swung open to expose only the engine. To this end, pivot apertures are provided at one edge of the hatch which receive the pins fixed to the chassis. Thus, the aforementioned portion of the shroud, together with the hatch, may be swung open to expose the engine and drive train, while only the hatch may be opened to expose the engine for minor adjustments and maintenance.

BRIEF DESCRIPTION OF THE DRAWING

FIG. 1 is a right front, perspective view of a lift truck according to this invention;

FIG. 2 is a left rear, perspective view of the lift truck illustrated in FIG. 1;

FIG. 3 is a fragmentary, elevational view of the lift truck, showing a portion of the shroud pivoted to an open position to expose the engine and drive train of the truck.

FIG. 4 is a fragmentary, perspective view of the lift truck, showing a hatch swung to an open position to expose only the engine compartment; and FIG. 5 is a fragmentary, perspective view of the pivotal connections between the chassis, the hatch, and the portion of the shroud.

DETAILED DESCRIPTION OF THE INVENTION

Referring now to the drawing, there is illustrated a fork lift truck 10 according to this invention. The lift truck 10 includes a frame or chassis 12 and a fork lift 14 mounted at one end of the chassis in front of a pair of front wheels 16. The lift truck 10 also includes a pair of rear wheels 18, an engine 20, and a drive train 22 to the front wheels 16.

A shroud 24 is fixed to the chassis 12, and covers the engine 20 and drive train 22, and includes the truck's fenders 26 and a wall 28 which mounts the controls for the truck. A portion 30 of the shroud 24 is pivotable with respect to the remaining portions of the shroud, which are fixed to the chassis 12, so that the portion 30 may be raised to expose the engine 20 and drive train 22. To this end, there is provided a pair of fingers 32 welded to the chassis 12 and carrying a pin 34 at their upper ends. Each pin 34 extends through apertures 36 at one edge of the shroud portion 30. As may be noted in FIG. 3, the portion 30 may be held in its raised position by a prop 37, or by other suitable means, or if desired, a torsion spring arrangement may be associated with the pivot point of the portion 30. With the portion 30 in its raised position, easy access may be had to the engine 20 and the drive train 22 for maintenance and servicing. It may be noted that an operator's seat 38 is fixed to the shroud portion 30 so that the seat does not pose a problem to the person servicing the engine and drive train.

If routine maintenance is to be performed only on the engine 20, a hatch cover 40 is pivotal through a raised position illustrated in FIGS. 4 and 5. It may be noted that the hatch 40 is a portion of the shroud portion 30, but it may pivot relative to that portion. To this end, there are provided straps 41 welded to the rear edges of the hatch 40, and the straps 41 are provided with apertures which receive the pin 34 between the shroud 30 and the fingers 32. A prop need not be provided for the hatch 40, since it may be swung to a position where the center of gravity is rearward of the pin 34, and its light weight does not impose a strain upon its pivotal connection to the frame. When the hatch 40 is closed, it is held in that position by a pair of quick-release latches 42.

The invention is not restricted to the slavish imitation of each and every detail set forth above. Obviously, devices may be provided with change, eliminate, or add certain specific details without departing from the scope of the invention.

What is claimed is:

1. A fork lift truck having a chassis, a fork lift mounted at one end of said chassis in front of a pair of front wheels, an engine mounted on said chassis adjacent the rear end of the chassis, a drive train from said engine to said front wheels, a shroud covering said engine and said drive train, one edge of at least a portion of said shroud having apertures therein, said apertures receiving pins fixed to the chassis so that said portion of the shroud may be pivotally raised relative to remaining portions of said shroud to expose said engine and drive train, said portion of said shroud including a hatch covering the engine, one edge of said hatch having apertures therein, said apertures receiving said pins fixed to the chassis so that said hatch may be opened to expose only said engine.

2. A fork lift truck according to claim 1 wherein an operator's seat is mounted on said portion of said shroud.

* * * * *